(12) United States Patent
Chen

(10) Patent No.: US 10,730,577 B2
(45) Date of Patent: Aug. 4, 2020

(54) TWO-WHEELED SELF-BALANCING SCOOTER

(71) Applicants: Cho International Inc., Chino, CA (US); Zhejiang Longwise Technology Co., Ltd., Yongkang, Zhejiang Province (CN)

(72) Inventor: Junkang Chen, Yongkang (CN)

(73) Assignees: Cho International Inc., Chino, CA (US); Zhejiang Longwise Technology Co., Ltd., Yongkang (CN)

( * ) Notice: Subject to any disclaimer, the term of this patent is extended or adjusted under 35 U.S.C. 154(b) by 168 days.

(21) Appl. No.: 15/961,278

(22) Filed: Apr. 24, 2018

(65) Prior Publication Data

US 2019/0176922 A1    Jun. 13, 2019

(51) Int. Cl.
*B62K 11/00*    (2006.01)
*B62J 99/00*    (2020.01)

(52) U.S. Cl.
CPC ............. *B62K 11/007* (2016.11); *B62J 99/00* (2013.01)

(58) Field of Classification Search
CPC .................................................. B62K 11/007
See application file for complete search history.

(56) References Cited

U.S. PATENT DOCUMENTS

| | | | | |
|---|---|---|---|---|
| 9,376,155 B2* | 6/2016 | Ying | ................... | B62K 11/007 |
| 9,604,692 B1* | 3/2017 | Kim | ................... | B62K 23/08 |
| 10,421,006 B1* | 9/2019 | Li | ................... | A63C 17/011 |
| 2017/0349231 A1* | 12/2017 | Wood | ................... | B62K 11/007 |
| 2018/0334214 A1* | 11/2018 | Cuban | ................... | B62K 11/007 |
| 2019/0092387 A1* | 3/2019 | Ying | ................... | B62K 11/007 |
| 2019/0337585 A1* | 11/2019 | Ying | ................... | B62M 7/12 |

* cited by examiner

*Primary Examiner* — Kevin Hurley
(74) *Attorney, Agent, or Firm* — Timothy T. Wang; Ni, Wang & Massand, PLLC

(57) ABSTRACT

A two-wheeled self-balancing scooter includes a scooter body, two wheels separately located at two ends of said scooter body, a wheel motor built in each said wheel, a control circuit and a power supply fixed inside the scooter body and configured for controlling the movement of the two wheels, wherein the scooter body is made of a single frame, a connector fixed to each of said wheel wherein the single frame connects with each wheel through the connector, a pressure sensor located between each connector and the single frame wherein the pressure sensors are electrically linked with said control circuit, wherein the control circuit controls different speeds between said two wheels to complete a turn according to the different pressures detected at the pressure sensor at each wheel when the gravity center of the user shifts towards one wheel at turning.

6 Claims, 4 Drawing Sheets

TWO-WHEELED SELF-BALANCING SCOOTER

BACKGROUND

The instant disclosure relates to a two-wheeled self-balancing scooter.

With the continuous rise of living standards, people have become more focused on improvement of the quality of life. Fitness exercise, recreation and entertainment have become an indispensable part of people's lives. Fitness and entertainment equipment of various forms has been emerging in an endless stream. Self-balancing scooters that are easy to operate have become a trendy product for young people nowadays. Self-balancing scooters are small-sized and easy to operate with attractive appearance and have been favored by consumers. Today's self-balancing scooters in the market are mainly single-wheeled balancing scooters and two-wheeled balancing scooters, among them two-wheeled balancing scooters are safer and more suitable as scooters. However, the two-wheeled balancing scooters currently available in the market are still not perfect. The frame of a two-wheeled self-balancing scooter in the market is comprised of the left part and the right part. When the two-wheeled self-balancing scooter makes a turn, the frame revolves against the ground on one side, which is not safe and is likely to result in accidents.

SUMMARY

The purpose of this invention is to provide a very safe and stable two-wheeled self-balancing scooter.

What is disclosed herein is a new design of two-wheeled self-balancing scooter, including two wheels on both sides of the scooter body. There is a wheel motor built in each wheel, and there are control circuit and power supply that control the revolution speed of the wheels fixed in the scooter body. The two-wheeled self-balancing scooter body includes a single integrated frame. There are connectors on the wheels, and the frame is connected with the two wheels with these connectors.

There are pressure sensors fixed between each connector and the frame. The pressure sensors are connected to the control circuit electrically. When the two-wheeled self-balancing scooter makes a turn, the center of the user shifts to one wheel, and the pressures on the two pressure sensors are different for different revolving speeds of the two wheels, so that the two-wheeled self-balancing scooter can safely make a turn.

The connectors include a horizontal board and vertical board that are fixed and connected as well as the wheel motor and vertical board that are fixed and connected with each other.

Detachable anti-skid pedals are built in the frame.

LED lamps are installed on both the front and the back of the frame.

A portable handle is built in the middle of the scooter body.

The two-wheeled self-balancing scooter has the following technical traits that are better than those built with existing technologies:

There are connectors on the wheels of this two-wheeled self-balancing scooter. Each wheel is connected with the frame through a connector. The connection between the wheels and the frame with the connector can help enhance the structural strength between the wheels and the frame to avoid any deformation or fracture at the connecting positions due to excess stress. There are pressure sensors fixed between the connectors and the frame. The pressure sensors are connected with the control circuit electrically. With this structure, the two-wheeled self-balancing scooter can make a turn when the pressure sensors sense the pressures on both sides of the scooter. When the scooter makes a turn, the frame does not have to revolve against the ground, which makes the scooter safer.

In the two-wheeled self-balancing scooter, the connectors include a horizontal board and a vertical board that are fixed and connected. The wheel motor is connected with the frame via the horizontal board and the vertical board. This structure is detachable and can help lower the center of the two-wheeled self-balancing scooter and enhance stability. The wheel motor and the vertical board are fixed and connected with each other. The horizontal board and the frame are connected with an L-shape linking device. The L-shape device is fastened on the frame and movably connected with the horizontal board. The stability of the frame can be enhanced via the L-shape device which is located between the horizontal board and the ground, and makes it easier for the user to ride.

In the two-wheeled self-balancing scooter, LED lamps are installed on both front and back of the frame to provide lighting for users in dark to avoid accidents. The frame has a detachable anti-skid pedal which can be easily uninstalled for cleaning and maintenance. After long-time use, the anti-skid pedal will have wear and tear, and the anti-skid pedal can be replaced with a new one, this structure can help reduce the maintenance cost. There is a portable handle in the middle of the scooter body, so that users can carry it easily.

BRIEF DESCRIPTION

The parts are numbered as follows: 1—wheel, 2—body, 3—connector, 4—control circuit and power supply, 5—LED lamp, 6—pressure sensor, 7—portable handle, 8—shock absorption device, 9—recharging interface, 10—control switch, 11—wheel motor, 12—wheel installation axis, 21—frame, 22—lower cover plate, 23—anti-skid pedal, 31—horizontal board, 32—vertical board, 33—shock absorption device installation hole, 34—wheel installation hole, 35—wheel fixing hole, 36—set bolt, 81—connecting bolt, 82—set nut, 83—shock absorber spring, 84—connecting nut.

DETAILED DESCRIPTION

Figure 1:
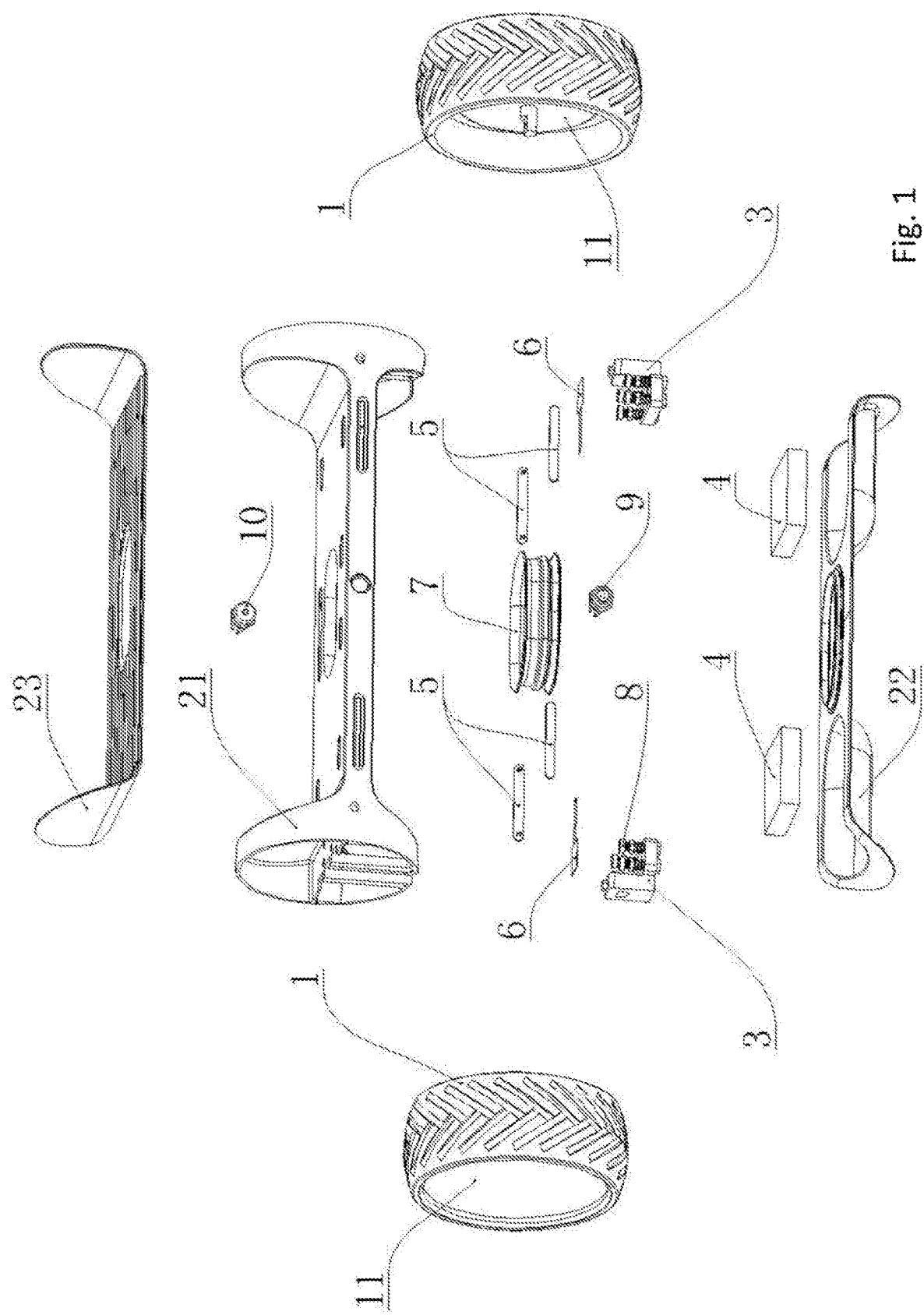
FIG. 1 is an explosive view of the structure of two-wheeled self-balancing scooter.
Figure 2:
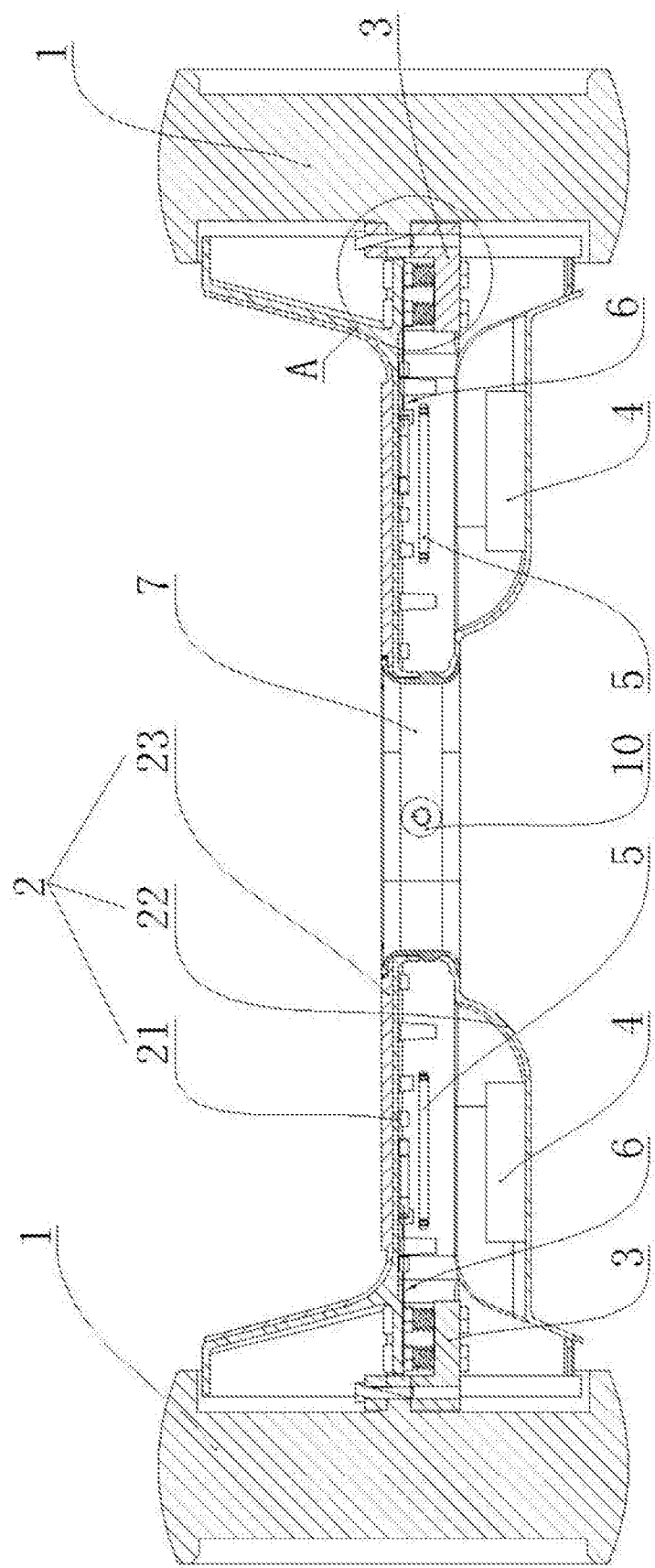
FIG. 2 is sectional view of the two-wheeled self-balancing scooter.
Figure 3:
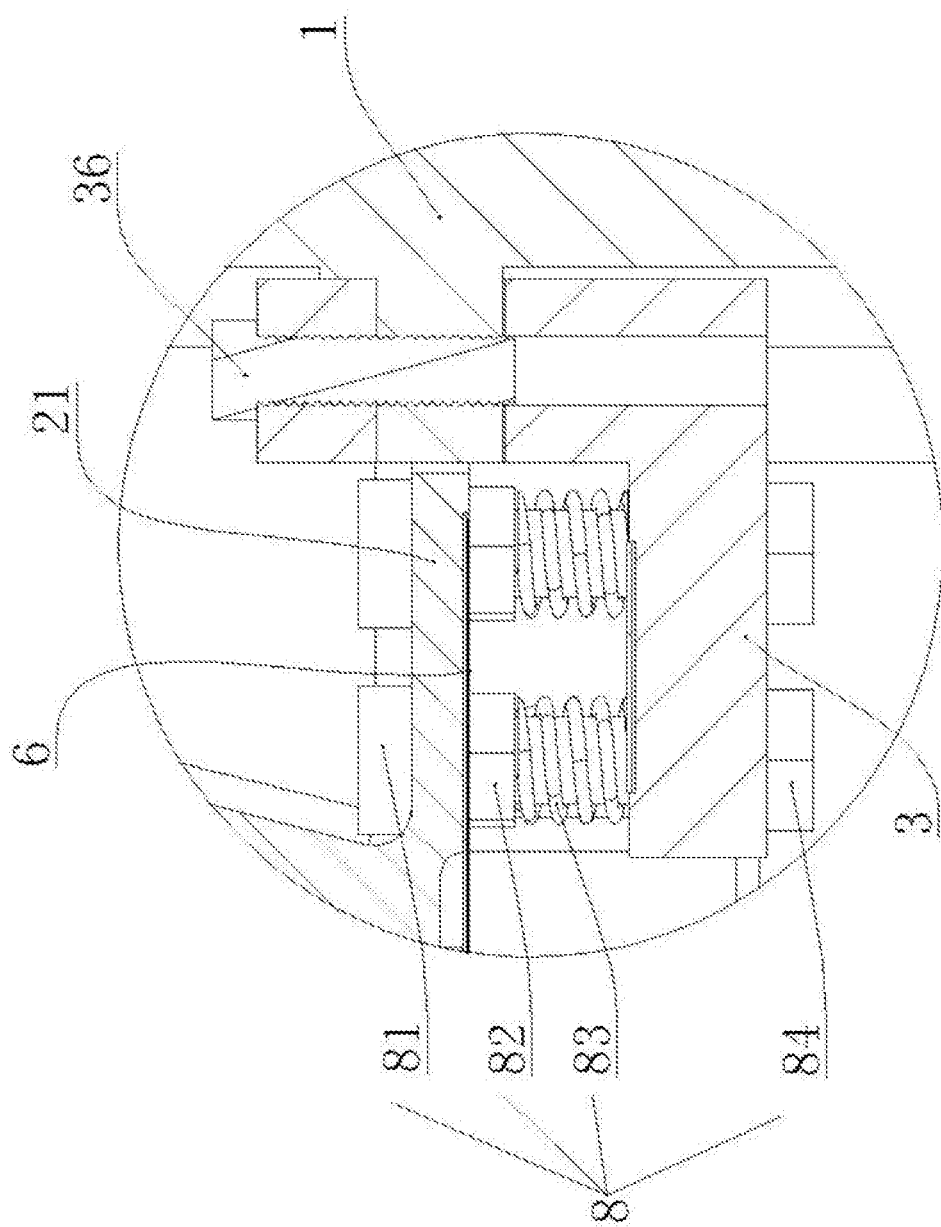
FIG. 3 is a partial enlarged drawing of part A in FIG. 2.
Figure 4:
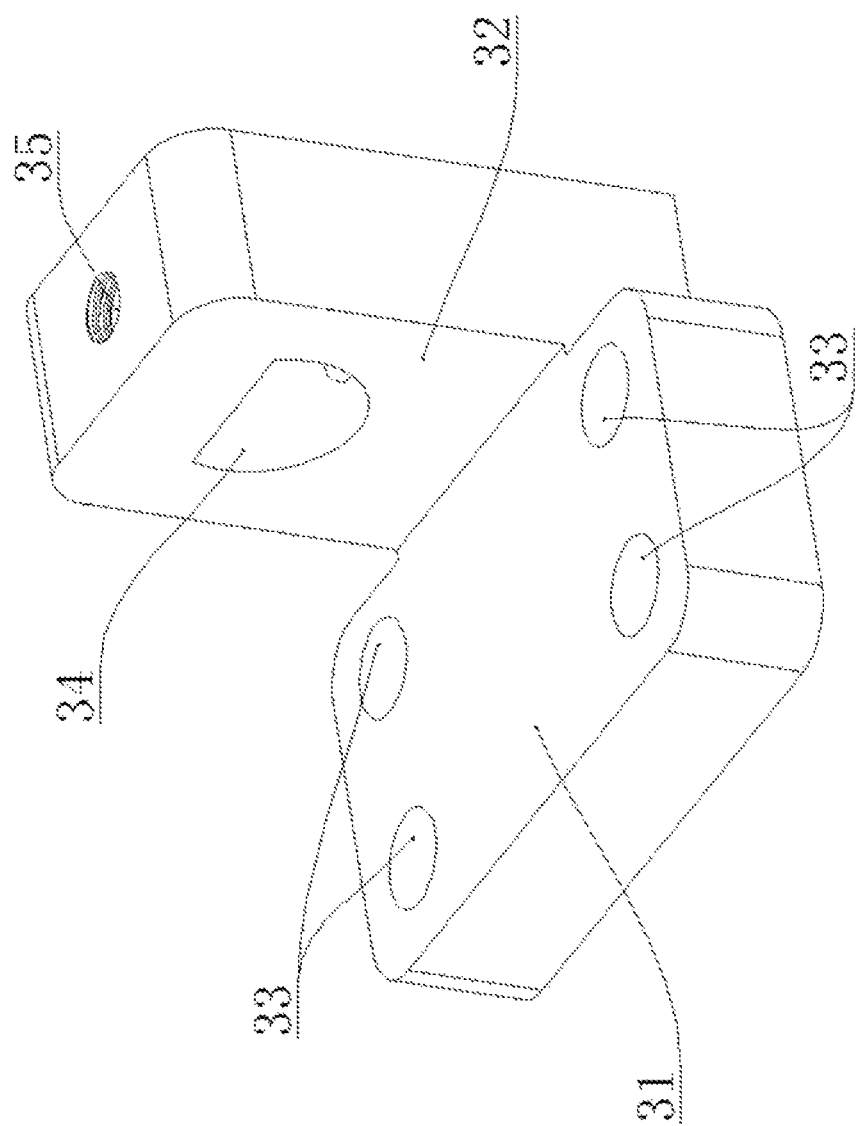
FIG. 4 is a structural representation of the connectors of the two-wheeled self-balancing scooter.

The two-wheeled self-balancing scooter is further described in detail according to the attached figures and specific embodiments as follows:

As shown in FIG. 1 to FIG. 4, discloses herein is a new design of a two-wheeled self-balancing scooter, including the scooter body and two wheels on both sides of the scooter body (2). There is a wheel motor (11) built in each wheel (1), and there is a control circuit and power supply (4) controlling the revolving speed of the wheels (1) fixed in the two-wheeled self-balancing scooter body (2). With the control circuit that controls the revolving speed and turning direction of the wheel motor (11) in the two wheels (1), the two-wheeled self-balancing scooter can go forward and backward and make turns. The scooter body (2) includes a single integrated frame (21). There is a detachable lower cover plate (22) on the lower part of the frame (21). There is a cavity between the frame (21) and the lower cover plate (22). The lower supply and the control circuit (4), the recharging interface (9) and a control switch (0) are built in the cavity. In this two-wheeled self-balancing scooter, it is better to build the power supply (4) in the cavity symmetrically and this can help enhance the stability and battery life of the scooter.

There are connectors on the wheels (1). The frame (21) is connected with the two wheels (1) via the connectors (3). The stress at the connecting point of each wheel (1) and the frame (21) is quite large, so that deformation or fracture may happen at the connecting point. With more durable connectors (3) that connect the wheels (1) and the frame (21), the structural strength at the connecting points between the wheels (1) and the frame (21) can be enhanced to avoid any deformation or fracture at the connecting points by excess stress. By this design, the safety can be improved, and useful life can be extended for this two-wheeled self-balancing scooter.

There are pressure sensors (6) fixed between each connector (3) and the frame (21). The pressure sensors (6) are connected to the control circuit electrically. The pressure sensors (6) are small, and when being installed, they do not have great impact on the structure of the connectors (3) and frame (21). In this structure, the pressure sensors (6) sense the pressures on both sides of this two-wheeled self-balancing scooter when it makes a turn. When the two-wheeled self-balancing scooter makes a turn, the center of the user shifts to one wheel (1), and the pressures on the two pressure sensors (6) are different, which leads to different revolving speeds of the two wheels (1) so that the scooter can make a turn quite safely.

Each of the connectors (3) includes a horizontal board (31) and a vertical board (32) that are fixed and connected. The wheel motor (11) and the vertical board (32) are also fixed and connected with each other via the horizontal board (31) and the vertical board (32), which can be easily detached and installed. The wheel motor (11) is fixed and connected with the vertical board (32). In installation, it is better to install the horizontal board (31) at a position lower than the central axis of the wheel motor (11). This structure can help lower the gravity center of the two-wheeled self-balancing scooter and enhance the stability of the two-wheeled self-balancing scooter. In this two-wheeled self-balancing scooter, there is a wheel installation axis (12) on each wheel (1), and there is a wheel installation hole (34) coordinating on the vertical board (32), and it is better to have a wheel fixing hole on the vertical board (32) and then fix and connect the wheel installation axis (12), and the wheel fixing hole (35) with the set bolt (36).

The frame (21) has shock absorption devices (8). Vibration in the motion of the two-wheeled self-balancing scooter can be reduced with the shock absorption devices. In the two wheeled self-balancing scooter, it is better to place the shock absorption devices (8) between the horizontal board (31) and the frame (21). This structure can help reduce the vibration transmitted from wheels (1) to the two-wheeled self-balancing scooter body (2), so that the vibration of the control circuit and power supply (4) inside the two-wheeled self-balancing scooter body can be reduced, the chance of circuit turnoff failure caused by vibration can be reduced, and the useful life of the two-wheeled self-balancing scooter can be extended. The shock absorption devices (8) are installed on the frame (1) and are movably connected to the horizontal board (13). The shock absorption devices (8) between the horizontal hoard (31) and the frame (21) can enhance the stability of the frame (21) and make it easier for the user to ride. In this two-wheeled self-balancing scooter, it is better to install the horizontal board (31) below the frame (21). The shock absorption devices (8) include shock absorption springs (83). There is the connecting bolt (81) and connecting nut (84) on the frame, and the frame (21), connectors (3) and the shock absorption springs (83) are connected with each other. On each connector (3), there is a shock absorption device installation hole (33) for each shock absorption device for the installation of the connecting bolt (81). The shock absorption spring (83) goes through the connecting bolt (81). The shock absorption spring (83) is fastened between the horizontal board (31) and the frame (21) via the connecting bolt (81) and the connecting nut (84), and it is better to fasten the connecting bolt (81) and frame (21) with the set nut (82). This structure can help enhance the structural strength of the connecting bolt (81) and frame (21) and avoid excess stress at the connecting position between the connecting bolt (81) and frame (21) that may damage the frame (21), so that the safety can be improved and service life of the two-wheeled self-balancing scooter can be extended. In the two-wheeled self-balancing scooter, four shock absorption devices (8) are installed on each connector (3).

A detachable anti-skid pedal (23) is installed on the frame (21) to increases the friction between the user and the two-wheeled self-balancing scooter for the avoidance of accidents. The detachable anti-skid pedal (23) is easy to clean and maintain, so that the maintenance cost is reduced. LED lamps (5) are installed on both front and back of the frame (21). In this two-wheeled self-balancing scooter, two LED lamps (5) are installed on both front and back of the frame (21) to provide lighting to users in dark for the avoidance of accidents, and the LED lamps (5) can also enhance the appearance of the two-wheeled self-balancing scooter.

There is a portable handle (7) in the middle of the two-wheeled self-balancing scooter body (2) to makes it easy to transport and carry the two-wheeled self-balancing scooter body. The portable handle (7) can be detachably installed on or built in the two-wheeled self-balancing scooter body (2). In the two-wheeled self-balancing scooter, it is better to build the portable handle (7) in the two-wheeled self-balancing scooter body (2), and the portable handle (7) goes through the two-wheeled self-balancing scooter body (2). This structure can help the assembly and production of this new design of two-wheeled self-balancing scooter and will not increase the size of the two-wheeled self-balancing scooter.

The above examples are for illustrative purposes and are not intended to limit the scope of the disclosure or the adaptation of the features described herein to particular components. Those skilled in the art will also appreciate that various adaptations and modifications of the above-described preferred examples may be configured without departing from the scope and spirit of the disclosure. Therefore, it is to be understood that, within the scope of the appended claims, the disclosure may be practiced by examples in addition to those specifically described.

What is claimed is:

1. A two-wheeled self-balancing scooter comprising:
a scooter body;
two wheels separately located at two ends of said scooter body;
a wheel motor built in each said wheel;
a control circuit and a power supply fixed inside said scooter body and configured for controlling the movement of said two wheels;
wherein said scooter body further comprises:
   a single frame;
   a connector fixed to each of said wheel wherein said single frame connects with each wheel through said connector;
   a pressure sensor located between each said connector and said single frame wherein said pressure sensor is electrically linked with said control circuit;
wherein said control circuit controls different speeds between said two wheels to complete a turn according to the different pressures detected at said pressure sensor at each wheel when the gravity center of the user shifts towards one wheel at turning, and wherein each said Connector has a horizontal board and a vertical board that are fixed and connected, and said wheel motor is coupled with the connector via the vertical board.

2. The two-wheeled self-balancing scooter of claim 1 further compromises a shock absorption device between the frame and the horizontal board and said shock absorption device is fixed on the frame and connected to the horizontal board.

3. The two-wheeled self-balancing scooter of claim 2 wherein the shock absorption device further comprises:
   one or more shock absorber springs;
   one or more connection nuts and bolts used to connect the frame, the shock absorption device and the connector.

4. The two self-balancing scooter of claim 1 wherein a detachable anti-skid pedal is built on top of the frame.

5. The two-wheeled self-balancing scooter of claim 1 wherein one LED lamp is installed at both front and back of the frame.

6. The two-wheeled self-balancing scooter of claim 1 wherein a portable handle can be detachably installed on or built in the scooter body.

* * * * *